US008445142B2

(12) United States Patent
Lee et al.

(10) Patent No.: US 8,445,142 B2
(45) Date of Patent: May 21, 2013

(54) ORGANIC ELECTROLYTIC SOLUTION AND LITHIUM BATTERY EMPLOYING THE SAME

(75) Inventors: Dong-Joon Lee, Yongin-si (KR); Young-Gyoon Ryu, Yongin-si (KR); Dong-Min Im, Yongin-si (KR); Sook-Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 405 days.

(21) Appl. No.: 12/775,997

(22) Filed: May 7, 2010

(65) Prior Publication Data

US 2010/0297508 A1  Nov. 25, 2010

(30) Foreign Application Priority Data

May 21, 2009 (KR) .................. 10-2009-0044628

(51) Int. Cl.
*H01M 8/00* (2006.01)
(52) U.S. Cl.
USPC ..................... 429/324; 429/231.95
(58) Field of Classification Search .......... 429/324, 429/231.95, 188, 306, 307, 347, 200
See application file for complete search history.

(56) References Cited

U.S. PATENT DOCUMENTS

| 6,022,643 | A | 2/2000 | Lee et al. | |
|---|---|---|---|---|
| 2004/0013944 | A1 | 1/2004 | Lee et al. | |
| 2004/0086757 | A1 | 5/2004 | Mohapatra | |
| 2004/0142246 | A1* | 7/2004 | Han et al. .................... 429/324 |
| 2004/0262559 | A1 | 12/2004 | Shibata | |
| 2007/0026318 | A1 | 2/2007 | Kishi et al. | |
| 2007/0176151 | A1 | 8/2007 | Chen et al. | |
| 2008/0142033 | A1 | 6/2008 | Sabbagh et al. | |
| 2009/0021894 | A1 | 1/2009 | Ning et al. | |

FOREIGN PATENT DOCUMENTS

| CN | 1045966 C | 10/1999 |
|---|---|---|
| EP | 1 172 878 A2 | 1/2002 |
| EP | 1 172 878 A3 | 5/2005 |
| EP | 1 920 755 A1 | 5/2008 |
| JP | 08-007921 | 1/1996 |
| JP | 2000-036608 | 2/2000 |

(Continued)

OTHER PUBLICATIONS

Abstract CN 1165826 Publication date Nov. 26, 1997.

(Continued)

*Primary Examiner* — Mark F Huff
*Assistant Examiner* — Monique Wills
(74) *Attorney, Agent, or Firm* — Christie, Parker & Hale, LLP

(57) ABSTRACT

An organic electrolytic solution including a lithium salt, an organic solvent, and a compound represented by the formula

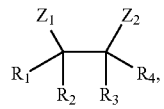

and a lithium battery employing the organic electrolytic solution. Groups $Z_1$ and $Z_2$ are each, independently, a cyano group, an isocyano group, a substituted or unsubstituted dicyanoethylphosphino group, or a substituted or unsubstituted dialkoxyphosphoryloxy group. Groups $R_1$ through $R_4$ are described fully in the Description. The organic electrolyte solution inhibits decomposition of an electrolytic solution and elution or precipitation of metal ions, and thus the lithium battery including the organic electrolytic solution has excellent cycle characteristics and lifetime characteristics.

7 Claims, 2 Drawing Sheets

FOREIGN PATENT DOCUMENTS

| | | |
|---|---|---|
| JP | 2000-036608 A | 2/2000 |
| JP | 2000-100487 | 4/2000 |
| JP | 2000-215911 | 8/2000 |
| JP | 2002-280061 | 9/2002 |
| JP | 2004-171981 | 6/2004 |
| JP | 2005-014701 | 1/2005 |
| JP | 2006-286382 A | 10/2006 |
| JP | 2007-035413 | 2/2007 |
| JP | 2007-048545 | 2/2007 |
| JP | 2007-121280 | 5/2007 |
| JP | 2008-123714 | 5/2008 |
| JP | 2008-198542 | 8/2008 |
| WO | WO 2004/106349 A1 | 12/2004 |
| WO | WO 2005/029632 A1 | 3/2005 |
| WO | WO 2007/091656 A1 | 8/2007 |

OTHER PUBLICATIONS

U.S. Appl. No. 12/775,940, filed May 7, 2010, Dong-joon Lee et al., Samsung SDI Co., Ltd.

* cited by examiner

ORGANIC ELECTROLYTIC SOLUTION AND LITHIUM BATTERY EMPLOYING THE SAME

CROSS-REFERENCE TO RELATED APPLICATION

This application claims the benefit of Korean Application No. 10-2009-0044628, filed May 21, 2009 in the Korean Intellectual Property Office, the disclosure of which is incorporated herein by reference.

BACKGROUND

1. Field

One or more embodiments of the present invention relate to an organic electrolytic solution and a lithium battery employing the same.

2. Description of the Related Art

As portable electronic devices become lighter and have increasingly high performance, batteries used therein are required to have high capacity and high output power. In order to manufacture a battery having high capacity, an active material having high capacity or a high charging voltage of the battery is used.

Metals or alloys are mainly used as high-capacity active materials, and thus the volume of the active material varies significantly during charging and discharging.

In a battery charged with high voltage, stability of a cathode active material is reduced, and decomposition of an electrolyte solution increases. If a battery charged with high voltage is stored at high temperature, discharge capacity decreases.

SUMMARY

One or more embodiments of the present invention include an organic electrolytic solution inhibiting decomposition of an electrolytic solution and elution or precipitation of metal ions.

One or more embodiments of the present invention include a lithium battery incorporating the organic electrolytic solution.

According to one or more embodiments of the present invention, an organic electrolytic solution includes a lithium salt, an organic solvent and a compound represented by Formula 1 below.

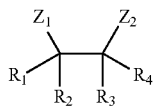

Formula 1

According to one or more embodiments of the present invention, a lithium battery includes a cathode; an anode; and the organic electrolytic solution.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
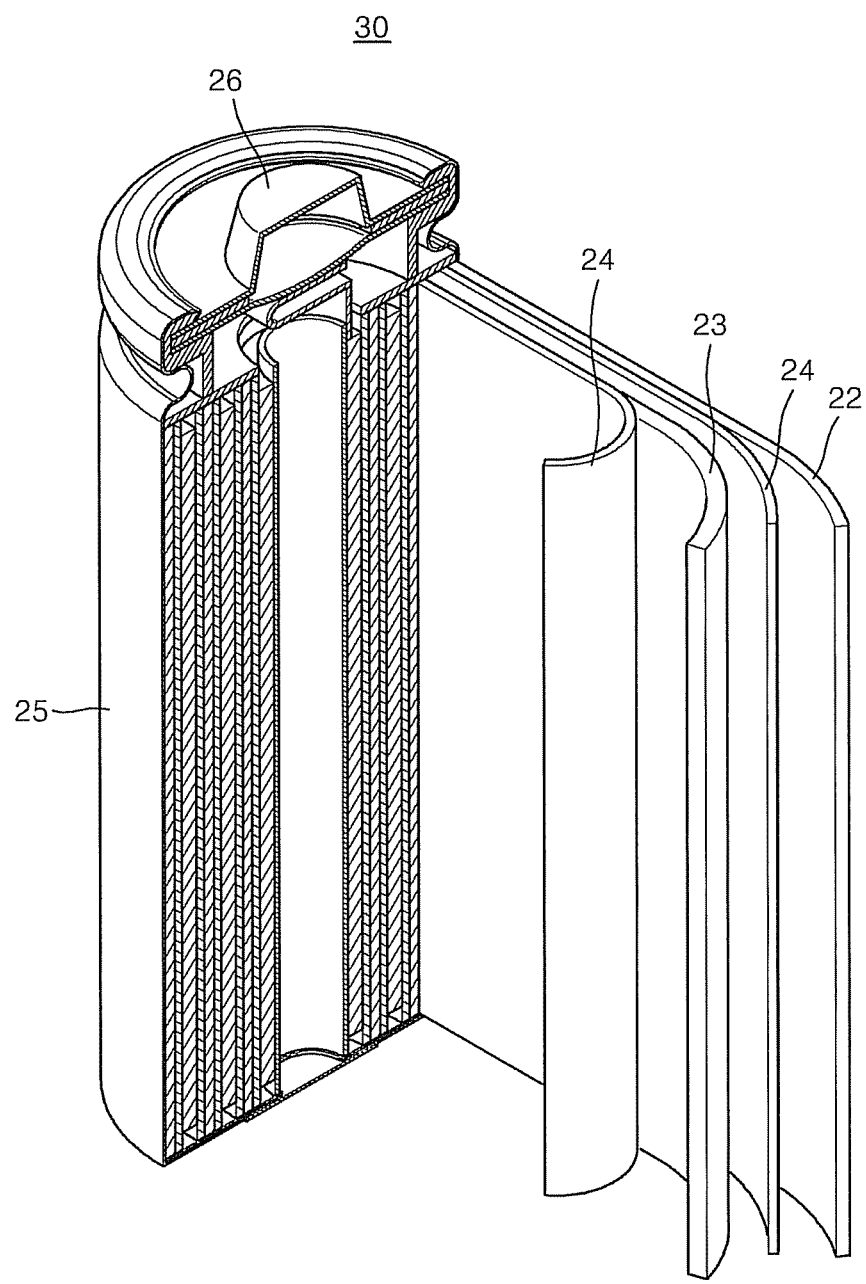
FIG. 1 is a schematic perspective view of a lithium battery according to an embodiment of the present invention.

Reference will now be made in detail to the present embodiments of the present invention, examples of which are illustrated in the accompanying drawings, wherein like reference numerals refer to the like elements throughout. The embodiments are merely described below in order to explain the present invention by referring to the figures.

An organic electrolytic solution according to an embodiment of the present invention includes a lithium salt, an organic solvent and a compound represented by Formula 1 below.

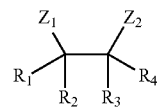

Formula 1

In Formula 1, $Z_1$ and $Z_2$ are each independently a cyano group, an isocyano group, a substituted or unsubstituted dicyanoethylphosphino group, or a substituted or unsubstituted dialkoxyphosphoryloxy group, and $R_1$, $R_2$, $R_3$ and $R_4$, which are the same or different, are each independently a hydrogen atom, a nitro group, an amino group, a hydroxy group, a halogen atom, a cyano group, a carboxyl group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, or a substituted or unsubstituted $C_4$-$C_{30}$ heteroarylcarbonyl group.

In the compound represented by Formula 1, some moieties are partially negatively charged due to localization of electrons on the molecule. The negatively charged moieties are coordinated with positive charges at the surface of a cathode to be adsorbed to the surface of the cathode, thereby forming a film. Since the film including the compound represented by Formula 1 is formed on the surface of the cathode, decomposition of a polar organic solvent on the surface of the cathode, by which the polar organic solvent is oxidized, may be inhibited. Since the decomposition of the polar organic solvent is inhibited, the cycle lifetime of a lithium battery employing the organic electrolytic solution may be improved. In addition, the film prevents metal ions from being eluted from the cathode to the electrolyte solution and prevents an increase of resistance of the lithium battery.

In addition, the compound of Formula 1 may form a part of a solid electrolyte interface (SEI) that is formed on the surface of an electrode during the initial charging and discharging.

Accordingly, the compound of Formula 1 changes the composition of the SEI film that normally includes only a polar organic solvent, and thus the SEI film including the compound of Formula 1 may have rigid properties after many cycles of charging and discharging. The rigid modified SEI film may efficiently prevent the organic solvent in which the lithium ions are dissolved from penetrating into the cathode during the intercalation of lithium ions. Thus, the SEI film may efficiently block direct contact of the organic solvent and the cathode. As a result, reversible charging and discharging may be performed for many cycles.

The compound represented by Formula 1 may be one of the compounds represented by Formulae 2 to 4 below.

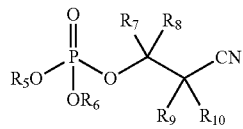

Formula 2

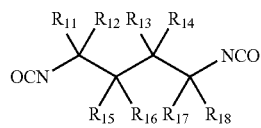

Formula 3

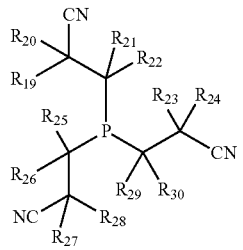

Formula 4

In Formulae 2 to 4, $R_5$ and $R_6$ are each independently a substituted or unsubstituted $C_1$-$C_{20}$ alkyl group, and $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$ and $R_{30}$, which are the same or different, are each independently a hydrogen atom, a nitro group, an amino group, a hydroxy group, a halogen atom, a cyano group, a carboxyl group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, or a substituted or unsubstituted $C_4$-$C_{30}$ heteroarylcarbonyl group.

The compound of Formula 2 may be diethyl(2-cyanoethyl)-phosphonate represented by Formula 5 below, the compound represented by Formula 3 may be 1,4-diisocyanatobutane represented by Formula 6 below, and the compound represented by Formula 4 may be tri-(2-cyanoethyl) phosphine represented by Formula 7 below:

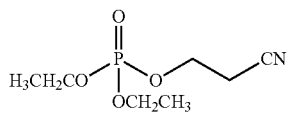

Formula 5

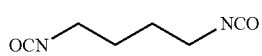

Formula 6

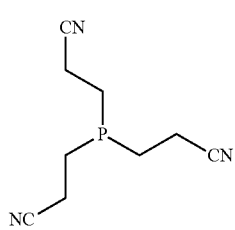

Formula 7

The substituents that are used in the present embodiment may be defined as follows. The term "alkyl" indicates a saturated, monovalent, straight or branched hydrocarbon group having about 1-20 carbon atoms, for example, about 1-10 carbon atoms, or about 1-6 carbon atoms. The alkyl group may be arbitrarily substituted with at least one halogen substituent. Examples of the alkyl group may include a methyl group, an ethyl group, a propyl group, a 2-propyl group, an n-butyl group, an iso-butyl group, a tert-butyl group, a pentyl group, a hexyl group, a dodecyl group, a fluoromethyl group, a difluoromethyl group, a trifluoromethyl group, a chloromethyl group, a dichloromethyl group, a trichloromethyl group, an iodomethyl group, and a bromomethyl group.

The term "aryl" indicates a monovalent, monocyclic, bicyclic, or tricyclic aromatic hydrocarbon group having 6-30 carbon atoms, for example, 6-18 carbon atoms. The aryl group may be arbitrarily substituted with at least one halogen substituent.

The term "alkenyl" indicates a straight or branched unsaturated hydrocarbon chain radical having one or more carbon-carbon double bonds therein and 2-20 carbon atoms, for example, 2-10 carbon atoms, or 2-6 carbon atoms. The alkenyl group binds to residual binding sites via a single bond or a double bond. Examples of the alkenyl group may include ethyl, prop-1-enyl, but-1-enyl, pent-1-enyl, and penta-1,4-dienyl.

The term "alkynyl" indicates a straight or branched unsaturated hydrocarbon chain radical having one or more carbon-carbon triple bonds and 2-20 carbon atoms, and for example, 2-10 carbon atoms, or 2-6 carbon atoms. The alkynyl group may bind to the residual binding sites via a single bond or a triple bond. Examples of the alkynyl group include ethynyl, prop-1-ynyl, but-1-ynyl, pent-1-ynyl, and pent-3-enyl.

The term "alkoxy" indicates an alkyl group bound to oxygen through a single bond and the oxygen in turn bonded through a single bond to another moiety.

The term "heteroalkyl" indicates an alkyl group, wherein at least one carbon atom in the backbone of the alkyl group is substituted with a hetero atom such as nitrogen, sulfur, oxygen, or phosphorus.

The term "heteroaryl" indicates an aryl group, wherein at least one carbon in the ring of the aryl group is substituted with a hetero atom such as nitrogen, sulfur, oxygen, or phosphorus.

The terms "alkylene", "alkenylene", and "alkynylene" indicate a bivalent alkyl group, alkenyl group, and alkynyl group, respectively.

The amounts of the compounds represented by Formulae 1 to 10 in the organic electrolytic solution according to the present embodiment may respectively be in the range of about 0.01 to about 10 parts by weight based on 100 parts by weight of the organic solvent. For example, the amount of the compounds may be in the range of about 0.01 to about 3 parts by weight based on 100 parts by weight of the organic solvent.

The organic solvent used in the organic electrolytic solution may be a nonaqueous organic solvent that functions as a medium through which ions participate in an electrochemical reaction of a battery. The nonaqueous organic solvent may include a carbonate solvent, an ester solvent, an ether solvent, a ketone solvent, an alcohol solvent, or an aprotic solvent. The carbonate solvent may be dimethyl carbonate (DMC), diethyl carbonate (DEC), dipropyl carbonate (DPC), methylpropyl carbonate (MPC), ethylpropyl carbonate (EPC), ethyl methyl carbonate (methylethyl carbonate, MEC or EMC), ethylene carbonate (EC), propylene carbonate (PC), butylene carbonate (BC), or the like. The ester solvent may be methyl acetate, ethyl acetate, n-propyl acetate, dimethylacetate, methylpropionate, ethylpropionate, γ-butyrolactone, 5-decanolide, γ-valerolactone, dl-mevalonolactone, γ-caprolactone, or the like. The ether solvent may be dibutyl ether, tetraglyme, diglyme, dimethoxy ethane, 2-methyltetrahydrofuran, tetrahydrofuran, or the like. The ketone solvent may be cyclohexanone, or the like. The alcohol solvent may be ethyl alcohol, isopropyl alcohol, or the like. The aprotic solvent may be a nitrile such as R—CN (where R is a $C_2$-$C_{20}$ straight, branched, or cyclic hydrocarbon which may include a double bonded aromatic ring or an ether bond), an amide such as dimethylformamide, dioxolane such as 1,3-dioxolane, sulfolane, or the like.

The nonaqueous organic solvents may be used alone or in combinations of at least two. If used in combinations, the ratio of the nonaqueous organic solvents may vary according to the performance of a desired lithium battery.

The lithium salt used in the organic electrolyte solution is dissolved in the organic solvent and functions a source of lithium ions in the lithium battery to basically operate the lithium battery and accelerate the migration of lithium ions between the cathode and the anode. Examples of the lithium salt are $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural number), LiCl, LiI and $LiB(C_2O_4)_2$ (lithium bis(oxalato) borate or (LiBOB)). The concentration of the lithium salt may be in the range of about 0.1 to about 2.0M. If the concentration of the lithium salt is within the range above, the organic electrolytic solution may have desired conductivity and viscosity, and thus the organic electrolytic solution may have excellent electrolytic properties, and lithium ions may migrate effectively.

A lithium battery according to another embodiment of the present invention includes a cathode, an anode and the organic electrolytic solution. The type of the lithium battery is not limited, and may be, for example, a lithium secondary battery, such as a lithium ion battery, a lithium ion polymer battery, a lithium sulfur battery, or the like; or a lithium primary battery.

The lithium battery includes an anode, a cathode, and an electrolyte, and may be prepared as described below. The cathode includes a current collector and a cathode active material layer formed on the current collector. First, a cathode active material, a conducting agent, a binder and a solvent are mixed to prepare a cathode active material composition. The cathode active material composition is directly coated on an aluminium (Al) current collector and dried to prepare a cathode plate. Alternatively, the cathode active material composition is cast on a separate substrate and the film obtained therefrom is laminated on an Al current collector to prepare a cathode plate. The method of manufacturing the cathode is known in the art, and thus a detailed description thereof will not be provided. The solvent may be N-methylpyrrolidone (NMP), water, or the like, without limitation.

A compound (lithiated intercalation compound) which allows reversible intercalation and deintercalation of lithium may be used as the cathode active material for forming the anode active material layer. In particular, the cathode active material may include at least one composite oxide of lithium and a metal selected from the group consisting of cobalt (Co), manganese (Mn), nickel (Ni), and combinations thereof. Examples of the cathode active material may include compounds represented by the following formulae.

$Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, $0 \leq c \leq 0.05$); $LiE_{2-b}X_bO_{4-c}D_c$ (where $0 \leq b \leq 0.5$, $0 \leq c \leq 0.05$); $Li_aNi_{1-b-c}Co_bBcD_\alpha$ (where $0.95 \leq a \leq 1.1$, $0 \leq b \leq 0.5$, $0 \leq c \leq 0.05$, $0 < \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, $0 < \alpha < 2$); $Li_aNi_{1-b-c}Mn_bX_cD_\alpha$ (where $0.95 \leq a \leq 1.1$, $0 \leq b \leq 0.5$, $0 \leq c \leq 0.05$, $0 < \alpha \leq 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, $0 < \alpha < 2$); $Li_aNi_bE_cG_dO_2$ (where $0.90 \leq a \leq 1.1$, $0 \leq b \leq 0.9$, $0 \leq c \leq 0.5$, $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.1$, $0.001 \leq b \leq 0.1$); $Li_aCoG_bO_2$ (where $0.90 \leq a \leq 1.1$, $0.001 \leq b \leq 0.1$); $Li_aMnG_bO_2$ (where $0.90 \leq a \leq 1.1$, $0.001 \leq b \leq 0.1$); $Li_aMn_2G_bO_4$ (where $0.90 \leq a \leq 1.1$, $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Co), and combinations thereof.

A surface coating layer may be formed on these compounds. Alternatively, a mixture of the compounds without having a coating layer formed thereon and a compound having a coating layer formed thereon, the compounds being selected from the above group, may be used. The coating layer may include at least one compound of a coating element selected from the group consisting of oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminium (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method that does not adversely affect the physical properties of the cathode active material when a compound of such a coating element is used, for example, a spray coating method, an immersion method, or the like. This is known in the art, and thus a detailed description thereof will not be provided.

The binder contained in the cathode active material layer functions to strongly bind cathode active material particles together and to the current collector. Examples of the binder may include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide (polyethylene oxide or PEO), polyvinylpyrrolidone, polyurethane, polytetrafluoroethylene, polyvinylidene fluoride, polyethylene, polypropylene, styrene-butadiene rubber (SBR), acrylated SBR (styrene acrylate co-polymer), epoxy resin, nylon (polyamide), and the like.

The conducting agent contained in the cathode active material layer is used to provide conductivity to the cathode. Any electrical conductive material causing no chemical change in batteries may be used. Examples of the conducting agent include carbonaceous materials, such as natural graphite, artificial graphite, carbon black, acetylene black, ketjen black, carbon fibers, and the like; metal-based materials, such as copper (Cu), nickel (Ni), aluminum (Al), silver (Ag), and the like, in powder or fiber form; and conductive materials, including conductive polymers, such as a polyphenylene derivative, and mixtures thereof.

The current collector may be formed of aluminum (Al), but is not limited thereto.

Similarly, an anode active material, a conducting agent, a binder and a solvent are mixed to prepare an anode active material composition. The anode active material composition is directly coated on a Cu current collector, or is cast on a separate substrate and an anode active material film obtained therefrom is laminated on a Cu current collector to obtain an anode plate. Amounts of the anode active material, the conducting agent, the binder and the solvent are those commonly used in a lithium battery.

A silicon/carbon complex ($SiO_x$), silicon metal, silicon thin film, lithium metal, a lithium alloy, a carbonaceous material or graphite may be used as the anode active material. The conducting agent, the binder and the solvent in the anode active material composition are the same as those in the cathode active material composition. If desired, a plasticizer may be added to the cathode active material composition and the anode active material composition to produce pores inside the electrode plates.

A separator may be interposed between the cathode and the anode according to the type of the lithium battery. The separator used in the lithium battery may be any separator that is commonly used for lithium batteries. In one embodiment, the separator may have low resistance to migration of ions in an electrolyte and have a high electrolyte-retaining ability. Examples of materials used to form the separator include glass fiber, polyester, a fluoropolymer such as polytetrafluoroethylene (PTFE), polyethylene, polypropylene, and combinations thereof, each of which may be a nonwoven fabric or a woven fabric. In particular, a windable separator formed of a material such as polyethylene or polypropylene may be used for a lithium ion polymer battery. A separator that may retain a large amount of an organic electrolytic solution may be used for a lithium-ion polymer battery. A method of forming these separators will now be described in more detail.

A polymer resin, a filler, and a solvent are mixed to prepare a separator composition. Then, the separator composition may be directly coated on an electrode, and then dried to form a separator film. Alternatively, the separator composition may be cast on a support and then dried to form a separator composition film, and the separator composition film exfoliated from the support may be laminated on an electrode to form a separator film.

The polymer resin is not particularly limited and may be any material that may be used as a binder for an electrode plate. Examples of the polymer resin include vinylidenefluoride/hexafluoropropylene copolymer, polyvinylidenefluoride, polyacrylonitrile, polymethylmethacrylate and mixtures thereof. For example, a vinylidenefluoride/hexafluoropropylene copolymer having about 8 to about 25 wt % of hexafluoropropylene may be used.

The separator may be interposed between the cathode plate and the anode plate to form a battery assembly. The electrode assembly is wound or folded and then sealed in a cylindrical or rectangular battery case. Then, an organic electrolyte solution is injected into the battery case to complete the manufacture of a lithium ion battery. Alternatively, according to an embodiment of the present invention, a plurality of electrode assemblies may be stacked in a multi-cell structure and impregnated with an organic electrolyte solution. The resultant is put into a pouch and sealed, thereby completing the manufacture of a lithium ion polymer battery.

FIG. 1 is a schematic perspective view of a lithium battery 30 according to an embodiment of the present invention. Referring to FIG. 1, the lithium battery 30 according to the present embodiment includes a cathode 23, an anode 22 and a separator interposed between the cathode 23 and the anode 22, and an electrolyte (not shown and bathing the cathode 23), the anode 22 and the separator 24, a case 25, and a sealing member 26 sealing the case 25. The lithium battery 30 is manufactured by sequentially stacking the cathode 23, the anode 22 and the separator 24 upon one another, winding the stack in a spiral form, and inserting the wound stack in the case 25.

Hereinafter, one or more embodiments of the present invention will be described in detail with reference to the following examples. However, these examples are not intended to limit the purpose and scope of the one or more embodiments of the present invention.

Preparation of Electrolyte Solution

PREPARATION EXAMPLE 1

0.3 parts by weight of diethyl(2-cyanoethyl)-phosphonate represented by Formula 5 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, $LiPF_6$, was added thereto, in order to prepare an organic electrolyte solution.

Formula 5

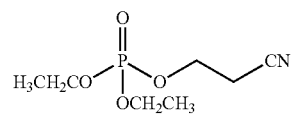

PREPARATION EXAMPLE 2

0.1 parts by weight of 1,4-diisocyanatobutane represented by Formula 6 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, $LiPF_6$, was added thereto, in order to prepare an organic electrolyte solution.

Formula 6

PREPARATION EXAMPLE 3

0.1 parts by weight of tri-(2-cyanoethyl)phosphine represented by Formula 7 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, $LiPF_6$, was added thereto, in order to prepare an organic electrolyte solution.

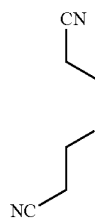

Formula 7

COMPARATIVE PREPARATION EXAMPLE 1

An organic electrolytic solution was prepared in the same manner as in Preparation Example 1, except that diethyl(2-cyanoethyl)-phosphonate was not added thereto.

Preparation of Lithium Battery

EXAMPLE 1

2032 standard coin cells were manufactured using a silicon oxide ($SiO_x$) electrode as an anode, a mixture of $Li_{1.167}$ $Ni_{0.2333}$ $Co_{0.1}$ $Mn_{0.4667}$ $Mo_{0.033}$ $O_2$ and $LiCoO_2$ in a weight ratio of 3:7 as a cathode, a CELGARD® (Celgard, LLC) separator membrane, and the organic electrolyte solution prepared according to Example 1.

A powder including $Li_{1.167}$ $Ni_{0.2333}Co_{0.1}$ $Mn_{0.4667}$ $MO_{0.033}$ $O_2$ and $LiCoO_2$ in a weight ratio of 3:7 respectively, a binder in which 5 weight % of polyvinylidene fluoride (PVdF) is dissolved in N-methylpyrrolidone (NMP), and a conducting agent (SUPER P®, Timcal SA) were mixed in a weight ratio of 94:3:3 in an agate mortar, in order to prepare a slurry for a cathode material.

The slurry was cast on a 15 μm aluminum foil using a doctor blade with an interval of 100 μm to obtain a cathode electrode. Then, the cathode electrode was dried in a primary drying process in an oven at 90° C. for about 2 hours so as to evaporate NMP, and the resultant was dried in a secondary drying process in a vacuum oven at 120° C. for about 2 hours to completely evaporate the NMP. Then, the cathode electrode was rolled to have a thickness of 60 μm.

A silicon oxide (SiO) powder and a binder including polyamideimide were mixed in a weight ratio of 90:1 in an agate mortar to prepare a slurry for an anode material. The slurry was cast on a 10 μm copper foil using a doctor blade with an interval of 60 μm to obtain an anode electrode. Then, the anode electrode was dried in a drying process in an oven at 90° C. for about 2 hours, and the anode electrode was rolled to have a thickness of 47 μm. The anode electrode was cured in a vacuum oven at 200° C. for about 1 hour.

EXAMPLE 2

Lithium batteries in the form of coin cells were prepared in the same manner as in Example 1, except that the organic electrolytic solution prepared according to Preparation Example 2 was used instead of the organic electrolytic solution prepared according to Preparation Example 1.

EXAMPLE 3

Lithium batteries in the form of coin cells were prepared in the same manner as in Example 1, except that the organic electrolytic solution prepared according to Preparation Example 3 was used instead of the organic electrolytic solution prepared according to Preparation Example 1.

EXAMPLE 4

Lithium batteries in the form of coin cells were prepared in the same manner as in Example 1, except that a cathode including $Li_2NiO_2$ and $LiCoO_2$ in a weight ratio of 1:9 was used instead of the cathode including $Li_{1.167}$ $Ni_{0.2333}$ $Co_{0.1}$ $Mn_{0.4667}$ $MO_{0.033}$ $O_2$ and $LiCoO_2$ in a weight ratio of 3:7.

EXAMPLE 5

Lithium batteries in the form of coin cells were prepared in the same manner as in Example 4, except that the organic electrolytic solution prepared according to Preparation Example 2 was used instead of the organic electrolytic solution prepared according to Preparation Example 1.

EXAMPLE 6

Lithium batteries in the form of coin cells were prepared in the same manner as in Example 4, except that the organic electrolytic solution prepared according to Preparation Example 3 was used instead of the organic electrolytic solution prepared according to Preparation Example 1.

COMPARATIVE EXAMPLE 1

Lithium batteries in the form of coin cells were prepared in the same manner as in Example 1, except that the organic electrolytic solution prepared according to Comparative Preparation Example 1 was used instead of the organic electrolytic solution prepared according to Preparation Example 1.

COMPARATIVE EXAMPLE 2

Lithium batteries in the form of coin cells were prepared in the same manner as in Example 6, except that the organic electrolytic solution prepared according to Comparative Preparation Example 1 was used instead of the organic electrolytic solution prepared according to Preparation Example 1.

EVALUATION EXAMPLE 1

Cycle Characteristics of Battery

Figure 2:
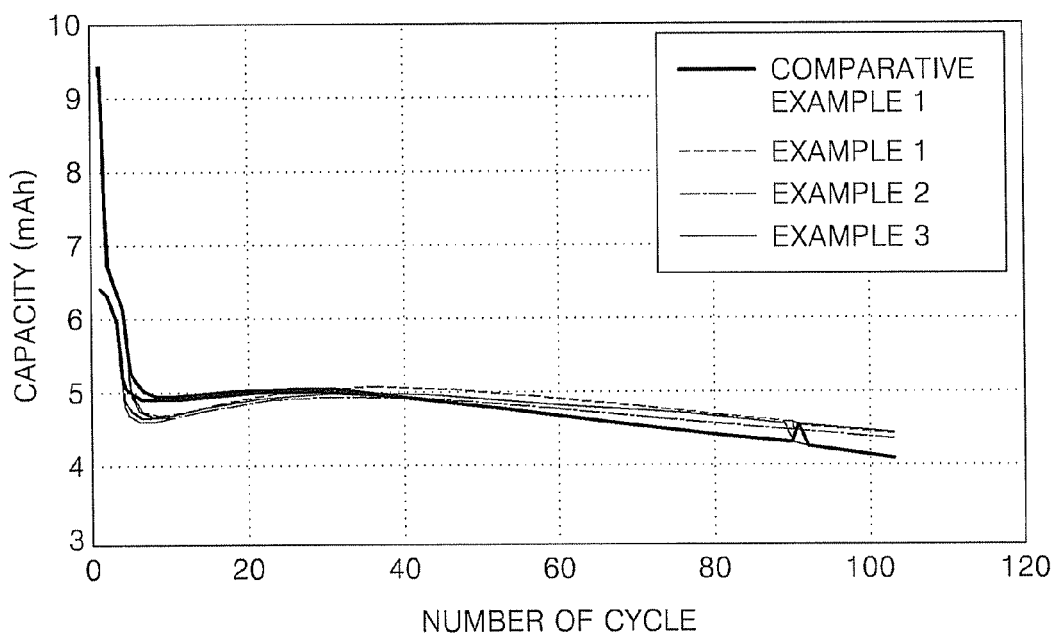
FIG. 2 is a graph illustrating capacity variation of lithium batteries prepared according to Comparative Example 1 and Examples 1 to 3.

The coin cells prepared according to Examples 1 to 3 and Comparative Example 1 were charged with a current of 0.05 C until the voltage of the cells reached 4.53 V and discharged with a current of 0.05 C until the voltage of the cells reached 2.5 V in a $1^{st}$ cycle. In a $2^{nd}$ cycle, the cells were charged with a current of 0.1 C until the voltage of the cells reached 4.50 V, charged while maintaining the voltage of 4.5 V until the current reached 0.05 C, and discharged with a current of 0.1 C until the voltage of the cells reached 2.5 V. In a $3^{rd}$ cycle, the cells were charged with a current of 0.5 C until the voltage of the cells reached 4.50 V, charged while maintaining the voltage of 4.5 V until the current reached 0.05 C, and discharged with a current of 0.1 C until the voltage of the cells reached 2.5 V. In the $4^{th}$ to $100^{th}$ cycles, the cells were charged in the same manner as described above, and discharged with a current of 0.8 C until the voltage of the cells reached 2.5 V. The $4^{th}$ or more cycles are referred to as a cycling mode, and the $4^{th}$ cycle is referred to as the $1^{st}$ cycle of the cycling mode. FIG. 2 is a graph illustrating capacity variation of the lithium batteries prepared according to Comparative Example 1 and Examples 1 to 3. The discharge capacity of the $4^{th}$ cycle is regarded as the standard capacity, and capacity retention of the $100^{th}$ cycle of the cycling mode is shown in Table 1 below. The capacity retention is defined by Equation 1 below.

Capacity retention of $100^{th}$ cycle of cycling mode [%]=Discharge capacity of $100^{th}$ cycle of cycling mode/Discharge capacity of $1^{st}$ cycle of cycling mode     Equation 1

TABLE 1

| Capacity retention of $100^{th}$ cycle of cycling mode (%) | |
|---|---|
| Comparative Example 1 | 79.9 |
| Example 1 | 92.3 |
| Example 2 | 91.1 |
| Example 3 | 90.5 |

Referring to Table 1 and FIG. 2, the capacity retention of the coin cells prepared according to Examples 1 to 3 into which compounds of Formulae 5 to 7 are added as additives according to embodiments of the present invention is greater than that of the coin cells prepared according to Comparative Example 1.

Figure 3:
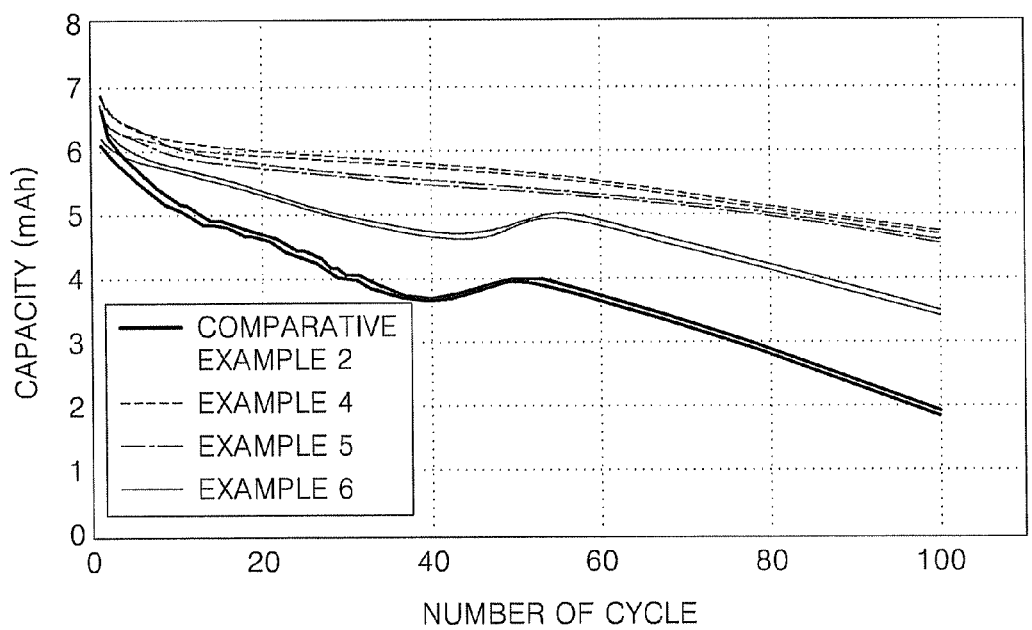
FIG. 3 is a graph illustrating capacity variation of lithium batteries prepared according to Comparative Example 2 and Examples 4 to 6 while being stored at high temperature.

The lithium batteries prepared according to Examples 4 to 6 and Comparative Example 2 were charged and discharged to the $3^{rd}$ cycle, and a cycling mode of the charged lithium batteries was tested in an oven at 60° C. The test was repeated until the $100^{th}$ cycle, and the results are shown in Table 2 below and FIG. 3. FIG. 3 is a graph illustrating capacity variation of the lithium batteries prepared according to Comparative Example 2 and Examples 4 to 6 while being stored at high temperature.

The capacity retention of the $100^{th}$ cycle at 60° C. is defined by Equation 2 below.

Capacity retention of $100^{th}$ cycle at 60° C. [%]=Discharge capacity of $100^{th}$ cycle at 60° C./Discharge capacity of $1^{st}$ cycle at 60° C.     Equation 2

TABLE 2

| Capacity retention of $100^{th}$ cycle of cycling mode at 60° C. (%) | |
|---|---|
| Comparative Example 2 | 33.3 |
| Example 4 | 74.6 |
| Example 5 | 72.8 |
| Example 6 | 57.8 |

As shown in Table 2 and FIG. 3, the capacity retention of the coin cells prepared according to Examples 4 to 6 into which compounds of Formulae 5 to 7 are added as additives according to embodiments of the present invention is greater than that of coin cells prepared according to Comparative Example 2 after being stored at high temperature.

As described above, according to the one or more of the above embodiments of the present invention, a lithium battery including the organic electrolytic solution has excellent stability at high temperature and long lifetime.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium battery comprising:
   a cathode;
   an anode; and
   an organic electrolytic solution comprising:
      a lithium salt;
      an organic solvent; and
      a compound represented by Formula 1:

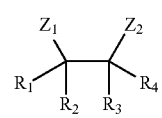

Formula 1 wherein Z1 and Z2 each independently comprise a cyano group, an isocyano group, a substituted or unsubstituted dicyanoethylphosphino group, or a substituted or unsubstituted dialkoxyphosphoryloxy group, R1, R2, R3 and R4, which are the same or different, each independently comprise a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxycarbonyl group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group.

2. The lithium battery of claim 1, wherein the compound represented by Formula 1 comprises a compound represented by Formula 2, 3, or 4:

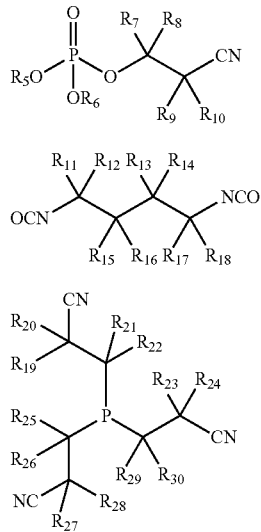

Formula 2

Formula 3

Formula 4 wherein R5 and R6 comprise a substituted or unsubstituted C1-C20 alkyl group,

R7, R8, R9, R10, R11, R12, R13, R14, R15, R16, R17, R18, R19 R20, R21, R22, R23, R24, R25, R26, R27, R28, R29 and R30, which are the same or different, each independently comprise a hydrogen atom, a nitro group, an amino group, a hydroxy group, a halogen atom, a cyano group, a carboxyl group, a substituted or unsubstituted C1-C20 alkyl group, a substituted or unsubstituted C2-C20 alkenyl group, a substituted or unsubstituted C2-C20 alkynyl group, a substituted or unsubstituted C1-C20 alkoxy group, a substituted or unsubstituted C2-C20 alkoxycarbonyl group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, or a substituted or unsubstituted C4-C30 heteroarylcarbonyl group.

3. The lithium battery of claim 2, wherein the compound represented by Formula 2 comprises a compound represented by Formula 5:

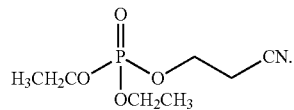

Formula 5

4. The lithium battery of claim 2, wherein the compound represented by Formula 3 comprises a compound represented by Formula 6:

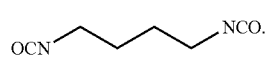

Formula 6

5. The lithium battery of claim 2, wherein the compound represented by Formula 4 comprises a compound represented by Formula 7:

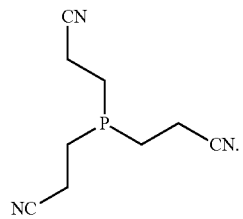

Formula 7

6. The lithium battery of claim 1, wherein the compound represented by Formula 1 is present in the organic electrolytic solution in an amount of about 0.01 to about 10 parts by weight based on 100 parts by weight of the organic solvent.

7. The lithium battery of claim 1, wherein the compound represented by Formula 1 is present in the organic electrolytic solution in an amount of about 0.01 to about 3 parts by weight based on 100 parts by weight of the organic solvent.

* * * * *

UNITED STATES PATENT AND TRADEMARK OFFICE
CERTIFICATE OF CORRECTION

PATENT NO. : 8,445,142 B2  Page 1 of 1
APPLICATION NO. : 12/775997
DATED : May 21, 2013
INVENTOR(S) : Dong-Joon Lee et al.

It is certified that error appears in the above-identified patent and that said Letters Patent is hereby corrected as shown below:

In the Claims

Column 13, Claim 2, line 31    Delete "R19 R20"

Insert -- R19, R20 --

Signed and Sealed this
Fifteenth Day of July, 2014

Michelle K. Lee
*Deputy Director of the United States Patent and Trademark Office*